3,433,645
ETHOXYLATED MONOGLYCERIDES IN BAKED GOODS

Richard Raymond Egan, Edina, and Sidney Bruce Lampson, Minnetonka, Minn., assignors to Ashland Oil & Refining Company, Ashland, Ky., a corporation of Kentucky
No Drawing. Filed Sept. 20, 1965, Ser. No. 488,747
U.S. Cl. 99—90                     8 Claims
Int. Cl. A21d *2/16;* C11c *3/08*

---

ABSTRACT OF THE DISCLOSURE

Ethoxylated derivatives of a partial glycerol ester of a higher fatty acid comprise a class of dough forming adjuvants whose presence in the dough lead to the preparation of yeast-raised baked goods of improved properties.

---

The present invention relates to baked goods having improved properties. In one aspect, the present invention relates to yeast raised baked goods (e.g., bread) which contain, as an additive or dough conditioner, alkoxylated monoglycerides. In still another aspect, this invention relates to an improved method for preparing bread.

In the preparation of baked goods, particularly bread, there is an increased tendency to employ various types of additives to retard staling, to improve texture, and the like. For example, monoglycerides are conventionally employed as additives in the manufacture of bread. These monoglycerides are believed to impart seven properties to a finished loaf of bread: (1) they enhance eating qualities by prolonging flavor freshness; (2) they give a finer, more uniform grain; (3) they improve texture; (4) they improve dough extensibility; (5) they aid in providing prolonged compressibility; (6) they increase loaf volume; and (7) they help give a symmetrical loaf. The use of monoglycerides and other additives in yeast-raised baked goods also improves the handling of doughs during fermentation and makeup. Another reason for employing additives in bread is to compensate, to the extent possible, for variations in the quality and/or composition of flour.

It has now been discovered, and this discovery forms a basis for the present invention, that ethoxylated monoglycerides are considerably more effective additives and conditioners for yeast-raised baked goods; e.g., bread, than are the corresponding monoglycerides and many other known bread additives. In bread, these ethoxylated monoglycerides have been observed to improve grain, texture, softness, color, and volume of the bread.

The novel additives of the present invention are effective in the three methods of bread baking: (1) the straight dough process; (2) the sponge-dough process; and (3) the continuous process. When compared with known, commercially available bread additives, the ethoxylated monoglycerides of the present invention have performed in an outstanding manner. For example, one widely used commercially available bread additive is calcium stearyl-2-lactylate. When this commercially available additives was compared in continuous bread making with a preferred additive of the present invention, the performance of the preferred additive (as measured by standard loaf scoring) equalled or exceeded that of the commercial additive in almost every case. Another advantage of the present additives is that higher levels of milk solids can be tolerated in bread because of the emulsification characteristics of these additives. While it is generally preferred to incorporate shortening in bread, it has been demonstrated that it is possible to prepare an acceptable loaf of bread without the use of any shortening, providing the additives of the present invention are employed. This is in strong contrast to the common monoglycerides which require the use of shortening to prepare an acceptable loaf of bread.

As previously indicated, the bread additives of the present invention are the alkoxylated (e.g. ethoxylated) condensates of monoglycerides. Typically, these condensation products or adducts will contain from 10 to 95 weight percent of ethylene oxide based on 100 parts by weight of ethoxylated monoglyceride. More commonly, these additives will contain from 25 to 80 weight percent of ethylene oxide based on 100 parts by weight of ethoxylated monoglyceride. A particularly preferred amount of ethylene oxide is from 45 to 75 weight percent (on the same basis).

One advantage of the present invention is that the additives can be prepared from a wide range of monoglyceride products. The monoglyceride products which can be reacted with ethylene oxide to prepare these novel additives can contain from as little as 10 weight percent up to 90 weight percent or more total (alpha plus beta) monoglycerides, with the balance, if any, comprising one one more of the following: (1) diglycerides, (2) triglycerides, and (3) glycerine. Typically, the monoglycerides will be present as mixtures with all three of these. Consequently, the bread additives of the present invention are typically very complex mixtures.

The monoglycerides can be prepared by a conventional glycerolysis reaction wherein a triglyceride oil or fat (e.g. hard tallow) is reacted with glycerine in the presence of a catalyst. Alternatively, these monoglycerides can be made by reacting glycerine with a fatty acid, usually in the presence of a catalyst. The preparation of suitable monoglycerides is a feat well within the skill of the art and as such, forms no part of the present invention. The commercially available monoglycerides already in use in the bread industry are extremely well suited to the practice of this invention. They commonly contain 25 to 90 weight percent total (alpha plus beta) monoglycerides with the balance as previously indicated.

It is preferred that the monoglycerides be prepared from $C_{10}$ to $C_{24}$ fatty acids, e.g., $C_{14}$ to $C_{18}$ fatty acids, or their corresponding triglycerides (e.g. those having $C_{10}$ to $C_{24}$ fatty radicals). As previously indicated, it has been observed that effective bread additives can be prepared by ethoxylating broad mixtures of monoglycerides (i.e. mixtures with, for example, diglycerides and glycerine) of the type already known to the baking art. Alternatively, distilled (90% alpha minimum) monoglycerides can be employed.

MANUFACTURE OF BREAD

In making bread doughs, the formulations are normally stated in terms of percentages (by weight) of 100 pounds of flour. Shortening represents about 2 to 5%, based on flour weight. The amount of mono- and diglycerides (or other additives) which are conventionally used is usually from 0.2 to 0.5% based on the weight of the flour or 5 to 8% based on the weight of shortening. The common mono- and diglycerides (and other approved additives) are nearly always added to a dough formulation as an integral part of the shortening.

In preparing bread, it is the gluten of wheat flour which holds the loaf together. Gluten is a protein substance which, when mixed with water in correct proportions, will form an elastic dough that is capable of holding gas and which will set to a spongy structure when heated in an oven. It is this phenomenon which makes possible the production of wheat bread as it is known. The prime objective in developing bread dough is to make sure that the elastic gluten particles are aligned in a more or less parallel arrangement. If a dough is kneaded too hard or too long, or if too much water is added, or if other factors or ingredients or physical handling are inept, elasticity of the gluten may be destroyed and a faulty product results.

Even though the common mono- and diglycerides and other additives usually represent only 0.2 to 0.5% based on the weight of the flour, they still provide the necessary lubrication and coating of the amylopectin chains and thereby aid in preventing starch crystallization at the molecular level. In this sense, they are surface-active chemicals. They perform their function in physical combination with the shortening. Since monoglycerides are normally found in all fats and oils at levels of a few tenths of 1%, they are considered natural ingredients. They are metabolized in the same manner as the triglycerides in all food fats.

The ingredients of bread dough are very simple. Broadly speaking, they consist of flour, water, salt, yeast, sugar, milk, shortening, and various additives such as the mono- and diglycerides. Flour is the primary food portion and it consists of about 11 to 13 weight percent protein with the remainder being starches, carbohydrates, etc. The salt acts as a flavoring and tightening agent for the gluten. Sugar is the fuel or food for yeast fermentation, and the milk (e.g. non-fat milk powder) is added for baked color qualities of the crust and toast. The type of shortening used is normally lard or hydrogenated vegetable oil.

While water is essential for plasticizing the flour, it is also important to bringing the yeast to life. The yeast is a living mass of beneficial bacteria which give off carbon dioxide after fermentation. This gas, in turn, helps to inflate the spongy dough mass.

At the present time, there are two preferred methods of bread production: (1) the sponge-dough process and (2) the continuous process. Of the two methods, the sponge-dough process is the most widely used throughout the industry, although the continuous process is gaining acceptance. The continuous method entails the use of complex automatic equipment whose economic feasibility hinges heavily upon high production.

The sponge-dough method of preparing bread involves the preparation of two distinct mixtures: the first is the sponge and the second, the dough. The ingredients for those two mixtures are typified by the following.

TABLE I

Ingredients for the sponge-dough process

| Sponge ingredients: | Percent |
|---|---|
| Flour | 65 |
| Water | 37.2 |
| Yeast | 2.5 |
| Yeast food (e.g. sugar) | 0.5 |
| Dough ingredients: | |
| Flour | 35 |
| Sugar | 8 |
| Salt | 2 |
| Shortening (e.g. lard) | 3 |
| Non-fat milk product | 6 |
| Water | 28.2 |
| Additive (e.g. monoglyceride) | 0.2 |

According to this procedure, all of the ingredients are handled at room temperature and mixing begins with the sponge. The yeast and yeast food are first dissolved in part of the sponge water. This yeast solution and the rest of the sponge water are added to the flour and all ingredients blended in a mixer for approximately 4 minutes at low speed. The sponge is then fermented for 4½ hours at about 86° F. and a relative humidity of 75%. After fermentation, the sponge is returned to the mixer, water for the dough is added, and one-half of the dough flour is placed on top of the water. All other ingredients are added except the shortening. The remainder of the flour and the shortening containing the additive is then added and mixed for approximately 8–10 minutes. The sponge-dough mixture is then fermented for 18–20 minutes. After each of the various mixing processes, the dough must be rested for periods varying from 20 minutes to an hour. The rest affects the development of gluten which, in turn, affects the texture and flavor of the finished loaf. Finally, the dough is divided into 18–20 ounce pieces, rounded, and placed in bread pans. The overall time for the sponge-dough process, up to the time it is ready for the oven, is from 4 to 7 hours. Baking time usually takes about 25 minutes.

In strong contrast to the sponge-dough method, the continuous process of mixing only takes about an hour and thirty minutes. Table II sets forth a typical list of ingredients and their proportions for use in this process:

TABLE II

Ingredients for the continuous bread process

| | Percent |
|---|---|
| Flour | 100 |
| Water | 60 |
| Salt | 2 |
| Yeast | 2.5 |
| Sugar | 8 |
| Milk | 3.5 |
| Shortening (plus common additives) | 2.5 |

According to this process, all of the ingredients are fed continuously into a mixer and are combined to form a continuous dough mass. The dough flow rate is volumetrically or gravimetrically fed to developing equipment. Whereas mixing in the straight and sponge-dough processes takes place in large open containers, the mixer in the continuous process is hydrostatically full and operates at 50 to 60 pounds pressure, with no gas-filled space. For this reason, all gas bubbles in the dough mass receive the same dividing and dispersing action in the mixing cycle and end up more uniformly distributed in the bread. This results in a predictably finer grain. Fine grain products always appear whiter because the cells on the cut grain surface are relatively small and shallow, and consequently show less shadow. Kneading the dough helps develop the gluten and contributes to a uniform structure and gas retentive properties. The developed dough is then moved to a divider where the continuously extruded dough is cut off and deposited in baking pans. Then, the dough is ready for proofing and then baking for about 25 minutes.

USE OF THE ALKOXYLATED MONOGLYCERIDES

In using the alkoxylated monoglycerides of the present invention, they can be blended with the shortening in the same manner as the common monoglycerides (i.e., 1–20%, e.g., 3–10%, based on the weight of the shortening) or they can be added separately during the preparation of the dough. In the sponge-dough process, they can be added to the sponge or dough as desired. If desired, the ethoxylated monoglycerides can be pre-blended with flour in the proper proportions to thereby provide a dry, free-flowable mixture. Since the ethoxylated monoglycerides are typically semi-solids or pasty, it is advantageous to melt them before use to facilitate blending with the other ingredients. It should be noted that the alkoxylated monoglycerides of the present invention can range from liquids to solids (at room temperature) depending on the nature of the condensate (e.g., depending upon the amount of ethylene oxide condensed).

Typically, the ethoxylated monoglycerides of the present invention will be used in lieu of the common bread additives. However, it is possible and may sometimes be desirable to employ the ethoxylated monoglycerides of the present invention in conjunction with common monoglycerides as well as in conjunction with other known additives (e.g., calcium stearyl-2-lactylate).

The amount of alkoxylated monoglyceride employed as an additive in bread and other baked goods will typically be an effective amount ranging from more than incidental impurities up to 1% or more, based on the weight of the flour. More frequently, the amount of additive employed will be from 0.05 to 0.6% based on the weight of the flour. As a practical matter, most bakers will probably employ amounts of these additives ranging from 0.2 to 0.5%, on the same basis.

When the alkoxylated monoglycerides are compared as bread additives with the common monoglycerides, the alkoxylated monoglycerides offer advantages in terms of the appearance of the loaf of bread produced as well as improvements in grain and texture. Additionally, benefits are frequently obtained in terms of the volume of the loaf produced from a given quantity of dough, and machinability is improved.

Since the monoglycerides employed in the practice of this invention are frequently and advantageously (from an economic standpoint) mixtures of alpha and beta monoglycerides with diglycerides, triglycerides, and/or free glycerine, calculation of the number of moles of ethylene oxide which have been condensed is not a simple task. For the sake of simplicity and consistency, the references contained herein to the weight percent of ethylene oxide are based on the weight of the complex ethoxylated monoglyceride mixture. Therefore, it is desirable to consider both the figures regarding the weight percent ethylene oxide in the complex condensate, and the figures regarding the percentage of total monoglyceride present in the initial crude monoglyceride to effectively compare various test data. By using these two sets of figures, it is possible to make fairly accurate comparisons of two different ethoxylated monoglyceride products. This is particularly true since the amount of diglyceride, triglyceride, and free glycerine present in a commercially available monoglyceride is essentially fixed once the percent of total (alpha plus beta) monoglyceride content is determined.

The present invention will be further understood by reference to the following specific examples which include a preferred embodiment. Unless otherwise indicated, all parts and percentages are by weight.

PREPARATION OF ALKOXYLATED MONOGLYCERIDES

Example I

A monoglyceride was prepared from a mixture of 90 parts of hydrogenated tallow (i.e., a fatty triglyceride), 10 parts of glycerine, and 0.3 part of powdered potassium hydroxide. This mixture was heated at atmospheric pressure to 320° F. while using a nitrogen sparge. The glycerolysis reaction was terminated after two hours. The resulting product was analyzed and found to contain approximately 30% total monoglycerides (25% alpha monoglyceride), and 2.2% free glycerine. The remainder was a mixture of di- and triglycerides.

Ethylene oxide was then condensed with this crude monoglyceride product at a temperature of 340° to 350° F. and a pressure of 30 to 50 p.s.i.g. The reaction vessel employed was a stainless steel Parr bomb and the reaction time was about 15 minutes. The ethylene oxide was introduced into the bomb through a tube having its exit-end located near the gravimetric bottom of the Parr bomb. Sufficient ethylene oxide was introduced into the reaction vessel to form an ethoxylated product containing 29.8 weight percent ethylene oxide based on 100 parts by weight of the complex ethoxylated monoglyceride. The catalyst employed during the ethoxylation reaction was the same potassium hydroxide employed during the glycerolysis. The complex ethoxylated monoglyceride obtained by this technique was a white, semi-solid.

Example II

The procedure of Example I was repeated using the same crude monoglyceride. The condensation reaction was continued until an ethoxylated monoglyceride had been produced which contained 46.1% ethylene oxide. This complex product was a white, semi-solid.

Example III

The procedure of Example I was repeated using the same crude monoglyceride. The condensation reaction was continued until an ethoxylated monoglyceride had been produced which contained 51.4% ethylene oxide. This complex product was a white, semi-solid.

Example IV

The procedure of Example I was repeated using the same crude monoglyceride. The condensation reaction was continued until an ethoxylated monoglyceride had been produced which contained 55.8% ethylene oxide. This complex product was a white, semi-solid.

Example V

The procedure of Example I is repeated and the reaction is continued until an ethoxylated monoglyceride is produced which contains 70% ethylene oxide.

Example VI

The procedure of Example I is repeated. The reaction is continued until an ethoxylated monoglyceride is produced which contains 90% ethylene oxide.

Example VII

The condensation procedure of Example I is repeated using a commercially available mono- and diglyceride as the raw material (Starfol GMS 400). The total monoglyceride content of this product is about 53%. The condensation reaction is continued until an ethoxylated monoglyceride is produced which contains 55% ethylene oxide.

Example VIII

The condensation procedure of Example I is repeated using a commercially available monoglyceride as the raw material (Starfol GMS 900). This product contains a minimum of 90% alpha monoglycerides. The condensation reaction is continued until an ethoxylated monoglyceride is produced which contains 64% ethylene oxide.

USE OF ALKOXYLATED MONOGLYCERIDES IN BREAD

The following examples illustrate the use of alkoxylated monoglycerides as additives and dough conditioners for bread.

Example IX

Baking studies were conducted using the ethoxylated monoglycerides of Examples I–IV inclusive. For comparative purpose, the performance of these four products was compared with three commercially available additives These commercially available additives were (1) ethoxylated stearic acid containing 8 moles of ethylene oxide, (2) calcium stearyl-2-lactylate, and (3) sodium stearyl fumarate.

The basic bread formulation was as follows:

| | Percent |
|---|---|
| Flour | 100 |
| Water | 66 |
| Salt | 2 |
| Sugar | 4 |
| Shortening (unemulsified) | 2.5 |
| Milk powder | 5 |
| Yeast | 1.5 |
| Bread additive—varying amounts up to 0.5%. | |

As a standard, bread was prepared from this same basic formulation, without any additive. In running these tests, all conditions, etc., were identical. All of the dough was processed and baked in an identical manner according to the straight dough process.

Each additive was run at the 0.1%, 0.25%, and 0.50% levels. Further, each additive was tested at the 0.25% level with all of the shortening removed. Bread prepared from all four products of the present invention received at least a good performance rating and matched or surpassed bread prepared from the competitive samples evaluated. The ethoxylated monoglycerides containing 51.4% and 55.8% weight percent ethylene oxide gave the most favorable results. Further, the ethoxylated monoglycerides of the present invention were quite effective in producing good quality bread when all of the shortening had been omitted.

Example X

The ethoxylated monoglycerides of Examples I–IV were then used in the straight dough bread process at the 0.25% level. The performance of these complex condensates or adducts was compared with (1) a first control sample containing no additives and no shortening, (2) a second control sample containing no additives and the standard level of shortening (in this case 2.5%), (3) with a common commercially available monoglyceride (60–65% total monoglyceride), and (4) with calcium stearyl-2-lactylate.

During these tests, all four of the inventive products performed well. The ethoxylated monoglycerides containing 51.4% and 55.8% ethylene oxide were outstanding. Because of its outstanding nature, calcium stearyl-2-lactylate was used as the primary means for determining the relative performance of the inventive products. In every instance, the performance of at least one of the inventive products equalled or exceeded that for calcium stearyl-2-lactylate, when used in the same concentration (all other conditions being equal). The advantages to the use of ethoxylated monoglycerides become apparent when comparing grain, texture, color, and, sometimes, volume. Once again, the performance of the 51.4% and 55.8% ethylene oxide adducts was exceptional. The 55.8% ethylene oxide adduct was particularly outstanding.

Example XI

Numerous loaves of bread were made on continuous bread-making equipment. In all bakes (including the comparative bake which used calcium stearyl-2-lactylate), the additive level was at 0.25%, based on the weight of the flour.

The basic dough formulation consisted of 100 parts of flour, 67% water, 3% of lard plus flake, 2.5% yeast, 2% salt, 8% sugar, 2% milk, 0.75% yeast food, 60 p.p.m. potassium bromate, 15 p.p.m. potassium iodate, and 0.1% of calcium acid phosphate. The mixing head speed was 195 r.p.m. and the dough pan temperature was 105° F. Fermentation time was 2.5 hours.

Results obtained from these baking tests are shown in Table III which follows:

From Table III, it can be seen that the ethoxylated monoglycerides of the present invention are effective bread additives. They economically combine the advantages of the common monoglycerides with the bread improving properties of the other approved bread additives. Further, some of the more preferred additives of the present invention are capable of producing extremely high quality bread.

Having described the present invention with a certain degree of particularity, it will be realized that numerous minor modifications and variations, falling within the spirit and scope of this invention, will become obvious to one routinely engaged in the baking and additive arts. Accordingly, it is not intended that the invention be limited to any of the materials which have been specifically mentioned for the sake of illustration, but rather, it is intended to claim all novelty inherent in the invention.

What is claimed is:

1. In the preparation of yeast-raised bakery goods; the improvement of incorporating into the dough forming ingredients a dough conditioner in the amount of from 0.05–0.6 wt. percent based on the flour content thereof, said dough conditioner comprising a condensation product of from 10 to 95 part by weight ethylene oxide and correspondingly from 90 to 5 parts by weight of a partial glycerol ester of a $C_{10}$–$C_{24}$ fatty acid containing at least 10 wt. percent monoglyceride content with diglycerides triglycerides and glycerine constituting the balance.

2. The method of claim 1 wherein said dough conditioner is a condensation product of from 45–75 parts by weight ethylene oxide and correspondingly from 55 to 25 parts by weight of said partial glycerol ester.

3. The method of claim 2 wherein the partial glycerol ester is the glycerolysis product of hydrogenated tallow.

4. The method of claim 3 wherein said glycerolysis product contains about 30 wt. percent monoglyceride content.

5. The method as defined in claims 1, 2, 3, or 4, wherein said dough conditioner is incorporated in the dough forming ingredients in the amount of from 0.2–0.5 wt. percent based on the floor content thereof.

6. The method as defined in claims 1, 2, 3, or 4 wherein said dough conditioner is incorporated in the form of a dry blend of flour and the dough conditioner.

7. The method as defined in claims 1, 2, 3, or 4 wherein said yeast-raised bakery goods is prepared according to the sponge-dough process.

8 The method as defined in claims 1, 2, 3, or 4 wherein said yeast-raised bakery goods is prepared according to the continuous process.

TABLE III.—CONTINUOUS BAKING TESTS; LOAF SCORE

| | ADDITIVE | | | | | | | | | | | | | | | | | | | | Perfect score |
|---|---|---|---|---|---|---|---|---|---|---|---|---|---|---|---|---|---|---|---|---|---|
| | 29.8% ethylene oxide adduct | | | | 46.1% ethylene oxide adduct | | | | 51.4% ethylene oxide adduct | | | | 55.8% ethylene oxide adduct | | | | calcium stearyl-2-lactylate | | | | |
| Volume | 10 | 10 | 10 | 9 | 8 | 9 | 9 | 9 | 10 | 9 | 9 | 11 | 11 | 11 | 9 | 11 | 10 | 10 | 10+ | 9 | 10 |
| Grain | 18 | 18 | 19 | 19 | 18 | 17 | 19 | 19 | 19 | 19 | 18 | 19 | 19 | 19 | 19 | 19 | 19 | 18 | 19 | 19 | 20 |
| Texture | 18 | 18 | 18 | 18 | 18 | 15 | 18 | 17 | 18 | 18 | 18 | 20 | 19 | 19 | 17 | 19 | 19 | 18 | 18 | 17 | 20 |
| Crumb color | ¹8 | ¹8 | ¹8 | ¹8 | ⁷7 | ¹7 | ²8 | ²7 | 9 | 9 | 9 | 9+ | 9 | 9 | 9 | 9 | ¹8 | ¹8 | ²8 | ²8 | 10 |
| Softness | 14 | 14 | 14 | 14 | 14 | 14 | 14 | 14 | 14 | 14 | 14 | 14 | 14 | 14 | 14 | 14 | 14 | 14 | 14 | 14 | 15 |
| Total loaf score | 91 | 91 | 92 | 91 | 88 | 85 | 91 | 89 | 93 | 92 | 91 | 96 | 95 | 95 | 91 | 95 | 92 | 90 | 91 | 93 | 100 |

¹ Creamy color.   ² Very creamy.
NB: The overall quality of the bread prepared from the 55.8% ethylene oxide condensate or adduct was the highest of all the bread prepared in this series of tests.

References Cited

UNITED STATES PATENTS 5,099,927   5/1950   Johnston _____ 99—91

FOREIGN PATENTS 656,850   9/1951   Great Britain.

LIONEL M. SHAPIRO, *Primary Examiner.*

U.S. Cl. X.R.

99—91, 93, 118; 260—410.6